United States Patent Office 3,523,132
Patented Aug. 4, 1970

3,523,132
PERFLUOROCARBOXYLIC IMIDATES
Edwin Dorfman, Grand Island, and Claude Thomas Bean, Jr., Niagara Falls, N.Y., assignors to Hooker Chemical Corporation, Niagara Falls, N.Y., a corporation of New York
No Drawing. Filed Nov. 25, 1964, Ser. No. 413,981
Int. Cl. C07c *119/00*
U.S. Cl. 260—453          3 Claims

ABSTRACT OF THE DISCLOSURE

Perfluorocarboxylic imidates, their preparation by the reaction of a perfluoroalkylnitrile or perfluoroalkyldinitrile with an alcohol, and their utility as chemical intermediates.

---

This invention relates to perfluorocarboxylic imidates and a process for their preparation. More particularly this invention relates to imidates of perfluoroalkylcarboxylic acids.

In accordance with this invention there is provided perfluorocarboxylic imidates of the formula $$ROC(:NH)(CF_2)_mQ$$

wherein Q is selected from the group consisting of $C(:NH)OR'$, hydrogen and fluorine, R and R' are independently selected from the group consisting of alkyl, halogenated alkyl, alkenyl, halogenated alkenyl, aryl, arylalkyl, cyclohexyl, and cinnamyl; the sum of R and R' carbon atoms being at least two, and $m$ is a number from 1 to 18. Preferably, the above alkyl and alkenyl groups contain 1 to 12 carbon atoms while the preferred aryl is phenyl and alkyl substituted phenyl. Especially useful compounds are prepared when $m$ is a number from 2 to 10.

The process of this invention comprises reacting a perfluoroalkylnitrile or perfluoroalkyldinitrile with an alcohol, that is a monohydroxy compound, at atmospheric, autogenous or above atmospheric pressure. Time to complete the reaction is dependent upon the temperature employed and may vary from a few minutes to 24 hours or more. Suitably the reaction proceeds at temperatures from about room temperature to 125 degrees centigrade although lower initial reaction temperatures such as $-70$ degrees centigrade may be used.

It is a novel feature of the process of this invention to prepare perfluorocarboxylic mono-imidates of lower alcohols without a catalyst. Previously, products by the process of this invention were unobtainable unless substantial amounts of alkali catalyst were employed. It has now been found that imidates derived from the lower alcohols, e.g. methanol, may be prepared in good yields without a catalyst. Suitable catalyst for the higher alcohol products are the alkali metals such as sodium and potassium in an amount up to 15 percent of the stoichiometric amount of alcohol required. Preferably the catalyst is in an amount from about 1 to about 5 percent of alcohol as defined above.

The imidates of the present invention are useful as basic or starting monomers for heat resistant triazine polymers, and also as an intermediate in the production of other valuable chemical compounds such as dye stuffs and surface active coatings for textiles.

For example, poly(hexafluoropentamethylene perfluorosuberimidate) when heated to 250 degrees centigrade yields a triazine polymer which is heat stable at 430 degrees centigrade.

Alcohols which are suitable for preparing the imidates of this invention include but are not limited to alcohols such as methanol, ethanol, n-butanol, hexanol, octanol, decanol, 2-chloroethanol, phenylethanol, benzyl alcohol, cyclohexanol, allyl alcohol, crotyl alcohol, methylvinylcarbinol and cinnamyl alcohol.

Nitriles which are suitable for preparing the imidates of this invention include among others but are not limited to nitriles such as perfluorobutyronitrile, perfluorocapronitrile, perfluoroglutaronitrile, perfluorosuccinonitrile, perfluoroadiponitrile, perfluoropimelonitrile, perfluorosuberonitrile, perfluorosebaconitrile, perfluorovaleronitrile, perflurododecanonitrile, perfluorotetradecanonitrile, perfluorostearonitrile and perfluoroolenitrile.

The invention is illustrated by the following non-limiting examples. Temperatures are expressed in degrees centigrade and parts are by weight unless otherwise indicated.

EXAMPLE 1

To a reaction vessel at room temperature 4 parts of methanol were charged. Then the vessel was purged with, and maintained under, a nitrogen atmosphere. Five parts of perfluoroglutaronitrile were then charged and the vessel sealed. The reaction was allowed to proceed for one hour. Thereafter the excess methanol was distilled off and 5 parts of solid residue recovered. The residue was crystallized from benzene, filtered under nitrogen and then recrystallized. The white crystalline product had a melt point 107.5-108.5 degrees.

Calculated for $C_7H_8F_6N_2O_2$: C, 31.59%; H, 3.03%; F, 42.83%; N, 10.53%. Found: C, 32.12%; H, 3.09%; F, 41.05%; N, 10.41%.

The product was dimethyl perfluoroglutarimidate.

EXAMPLE 2

To a reaction vessel were charged 4.6 parts of ethanol, 24 parts of perfluorobutyronitrile and 0.1 part of sodium ethoxide. The mixture was maintained under an inert atmosphere and heated at 100 degrees for 2 hours. A clear, liquid product boiling point 100-105 degrees, refraction index (20 degrees) 1.3146 was obtained.

Calculated for $C_6H_6F_7NO$: C, 29.9%; H, 2.5%; N, 5.81%; F, 55.2%. Found: C, 30.15%; H, 2.23%; N, 6.0%; F, 55.44%.

The product was ethyl perfluorobutyrimidate.

EXAMPLE 3

To a Carius tube under nitrogen were added 6.4 parts of methanol (anhydrous) and 0.1 part of sodium methoxide. Then 45 parts of perfluorobutyronitrile were added to the tube. Thereafter, the tube was sealed and agitated for a period of time. The reaction product was distilled and a yield 97 percent of theory obtained. The clear liquid product boiled at 76 degrees and had a refractive index (at 23 degrees) 1.3067.

Calculated for $C_5H_4F_7NO$: C, 26.44; H, 1.77%; F, 58.57%; N, 6.17%. Found: C, 26.68%; H, 1.86%; F, 58.32%; N, 6.29%.

The product was methyl perfluorobutyrimidate.

EXAMPLE 4

To a molar excess of perfluorosuccinonitrile cooled to a temperature of about $-78$ degrees centigrade was added t-butyl alcohol. The reaction was allowed to warm to about $+22$ degrees and then stand for 12 hours. The imidate di-t-butyl perfluorosuccinimidate was obtained. The di-t-butyl perfluorosuccinimidate was then heated at 100 degrees for one hour and perfluoroethylenetriazene polymer was obtained. Infrared analysis showed typical strong triazene absorption bands at 1550 cm.$^{-1}$. The polymer was insoluble in aromatic and halogenated solvents. The polymer was cross linked.

EXAMPLE 5

Hexafluoropentanediol (4.9 parts) and 8.1 parts of perfluorosuberonitrile were stirred and heated at 115 degrees in a sealed tube for 6 days. Volatile products were removed under vacuum to obtain a thermosettable plastic polyimidate. Upon heating at 230 degrees the polyimidate converted to a triazene polymer with the loss of hexafluoropentainediol.

EXAMPLE 6

Perfluoroglutaronitrile 409 parts and hexafluoropentanediol, 424 parts, were mixed in a Carius tube and heated at 100 degrees for 2 hours, then at 115 degrees for 17 hours giving a homogenous viscous oil. After 41 hours additional heating at 115 degrees, the material was no longer fluid, but a clear light yellow polyimidate-triazine polymer. Further heating to 300 degrees removed hexafluoropentanediol leaving a triazine polymer.

Various changes and modifications may be made in the method of this invention, certain preferred forms of which have been described, and equivalents may be substituted without departing from the spirit and scope of this invention.

What is claimed is:

1. Perfluorocarboxylic imidates of the formula:

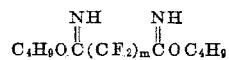

wherein $m$ is from 2 to 10.

2. A compound of the formula:

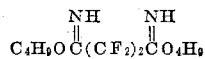

3. Di-t-butyl perfluorosuccinimidate.

References Cited

Zaitseva et al.: C.A., 59 (1963), p. 8749, QD–1–A51.

JOSEPH P. BRUST, Primary Examiner

U.S. Cl. X.R.

260—2, 78.4, 465.7